(12) United States Patent
Kuo

(10) Patent No.: US 12,128,982 B1
(45) Date of Patent: Oct. 29, 2024

(54) ELECTRIC SCOOTER

(71) Applicant: Ming C Kuo, Cerritos, CA (US)

(72) Inventor: Ming C Kuo, Cerritos, CA (US)

( * ) Notice: Subject to any disclaimer, the term of this patent is extended or adjusted under 35 U.S.C. 154(b) by 0 days.

(21) Appl. No.: 18/450,278

(22) Filed: Aug. 15, 2023

(51) Int. Cl.
| | |
|---|---|
| *B62H 1/02* | (2006.01) |
| *B62J 1/08* | (2006.01) |
| *B62J 1/20* | (2006.01) |
| *B62J 25/04* | (2020.01) |
| *B62K 11/10* | (2006.01) |
| *B62K 15/00* | (2006.01) |
| *B62K 23/06* | (2006.01) |
| *B62L 1/00* | (2006.01) |
| *B62L 3/02* | (2006.01) |

(52) U.S. Cl.
CPC ............ *B62K 11/10* (2013.01); *B62H 1/02* (2013.01); *B62J 1/08* (2013.01); *B62J 1/20* (2013.01); *B62J 25/04* (2020.02); *B62K 15/00* (2013.01); *B62K 15/006* (2013.01); *B62K 23/06* (2013.01); *B62L 1/00* (2013.01); *B60Y 2200/126* (2013.01); *B62K 2015/005* (2013.01); *B62K 2202/00* (2013.01); *B62L 3/02* (2013.01)

(58) Field of Classification Search
CPC ...... B62K 11/10; B62K 15/006; B62K 15/00; B62K 15/008; B62K 23/06; B62K 2202/00; B62K 2015/005; B62H 1/02; B62J 1/08; B62J 1/20; B62J 25/04; B62L 1/00; B62L 3/02; B60Y 2200/12; B60Y 2200/126
USPC ........................ 180/208; 280/278, 287, 639
See application file for complete search history.

(56) References Cited

U.S. PATENT DOCUMENTS

| | | | | |
|---|---|---|---|---|
| 7,021,413 B1* | 4/2006 | Lee | ............... | B62M 6/60 |
| | | | | 180/181 |
| 7,926,606 B2* | 4/2011 | Wang | ............... | B62K 5/007 |
| | | | | 280/278 |
| 9,376,158 B1* | 6/2016 | McCormick | ............... | B62K 3/002 |
| 9,604,688 B1* | 3/2017 | Yang | ............... | B62K 3/10 |
| 2005/0173175 A1* | 8/2005 | Lee | ............... | B62K 15/008 |
| | | | | 180/208 |
| 2009/0020350 A1* | 1/2009 | Wu | ............... | B62K 15/008 |
| | | | | 180/208 |
| 2009/0308676 A1* | 12/2009 | Wang | ............... | B62K 5/007 |
| | | | | 180/208 |

(Continued)

FOREIGN PATENT DOCUMENTS

| | | | |
|---|---|---|---|
| CN | 201058644 Y | * | 5/2008 |
| CN | 105501369 A | * | 4/2016 |

(Continued)

*Primary Examiner* — Keith J Frisby

(57) ABSTRACT

An electric scooter of standing drive has a pair of dolly wheels located behind the rear wheel to work as a parking stand. At the parked position with the handlebar stem folded, the scooter can be pulled away by hand, and vertically stand using the dolly wheels and the rear end of the deck frame to touch the ground. The scooter has a front wheel drive to assist it to start from stop, eliminating the kicking start. An electric scooter of standing-sitting drive is an improvement to the electric scooter of standing drive type. It has a seat of flat plate hinging on a pair of supporting parallel posts. The seat works as a front part of the standing deck for standing drive. When the posts rise to vertical, the seat is set for sitting drive. Its handlebar stem can be tilted and set to desired angles for comfortable driving.

9 Claims, 8 Drawing Sheets

(56) References Cited

U.S. PATENT DOCUMENTS

| | | | | |
|---|---|---|---|---|
| 2014/0203538 A1* | 7/2014 | Huang | ................... | B62K 3/002 |
| | | | | 280/639 |
| 2015/0210340 A1* | 7/2015 | Wang | ................... | B62K 15/006 |
| | | | | 280/278 |
| 2016/0089285 A1* | 3/2016 | Cheng | ................... | B62K 5/007 |
| | | | | 180/58 |
| 2018/0065703 A1* | 3/2018 | Li | ........................... | B62K 21/16 |
| 2020/0156727 A1* | 5/2020 | Chang | ....................... | B62J 1/08 |
| 2022/0033028 A1* | 2/2022 | McCormick | ........... | B62K 21/00 |

FOREIGN PATENT DOCUMENTS

| | | | | | |
|---|---|---|---|---|---|
| CN | 106697148 A | * | 5/2017 | ........... | B62K 15/008 |
| CN | 108263537 A | * | 7/2018 | | |
| GB | 2542146 A | * | 3/2017 | ............. | B62K 15/00 |

\* cited by examiner

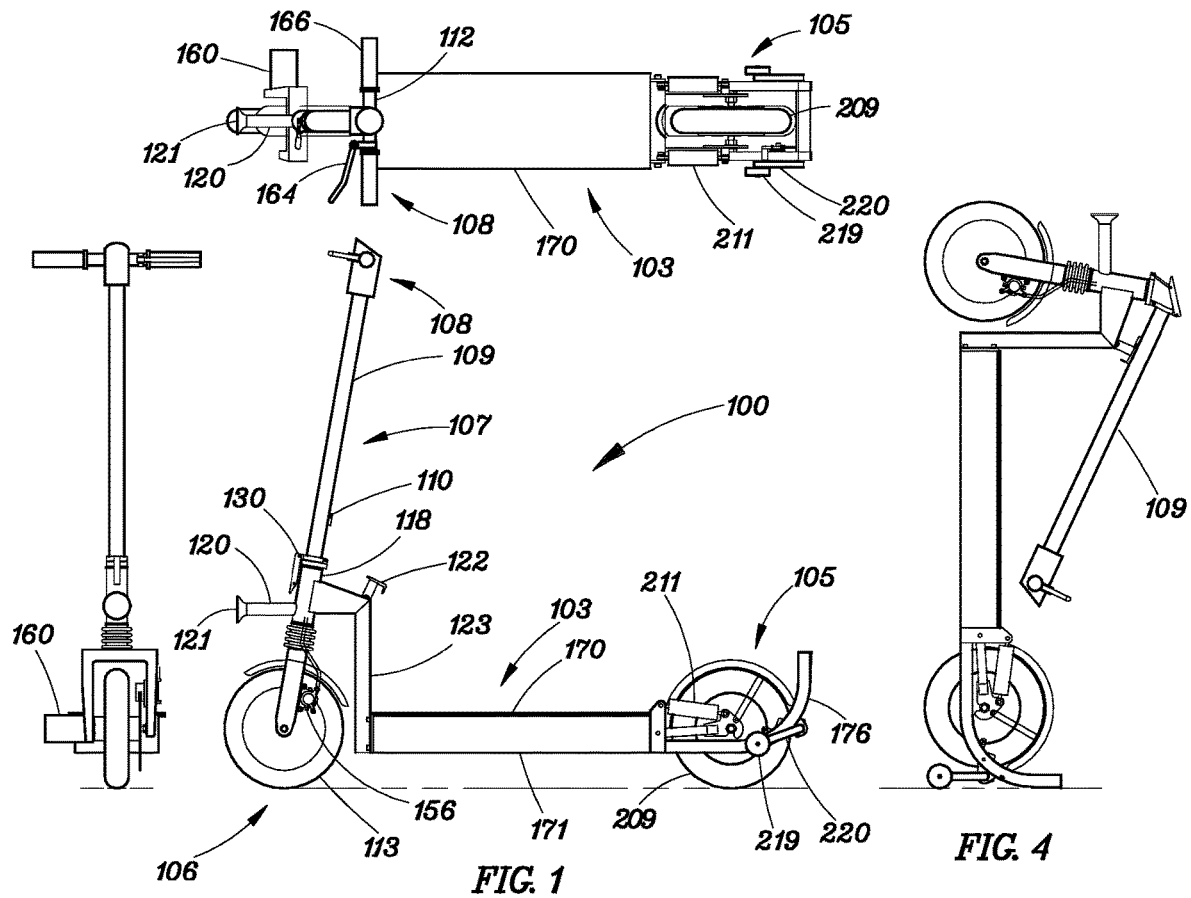
FIG. 1
FIG. 4
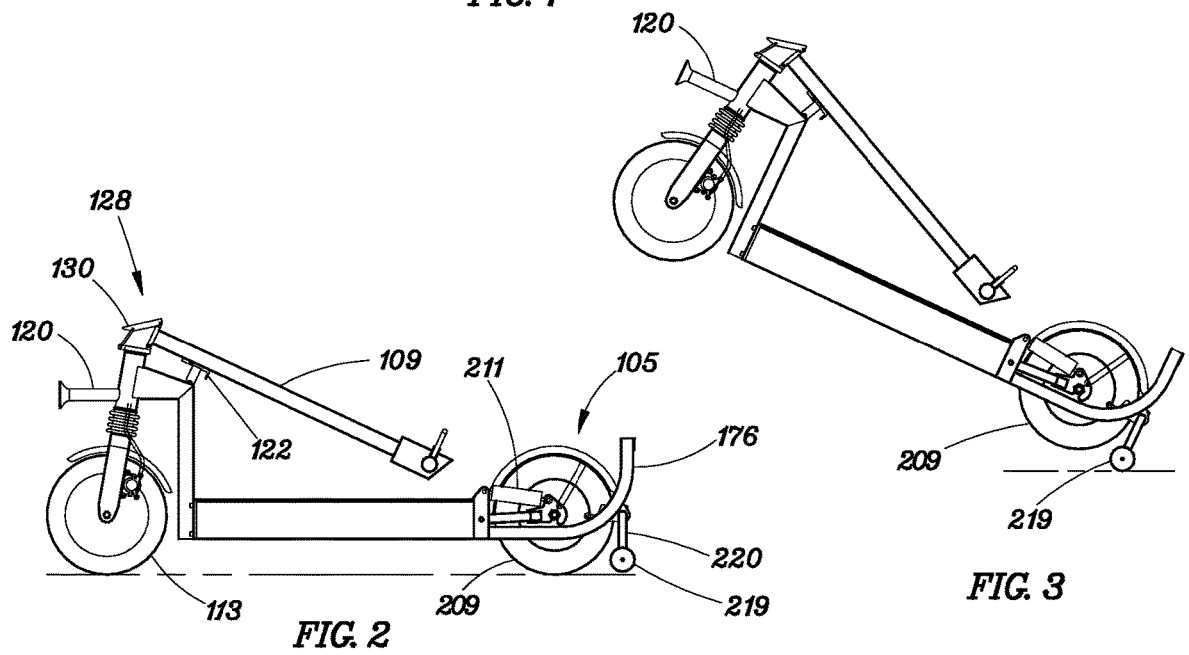
FIG. 2
FIG. 3

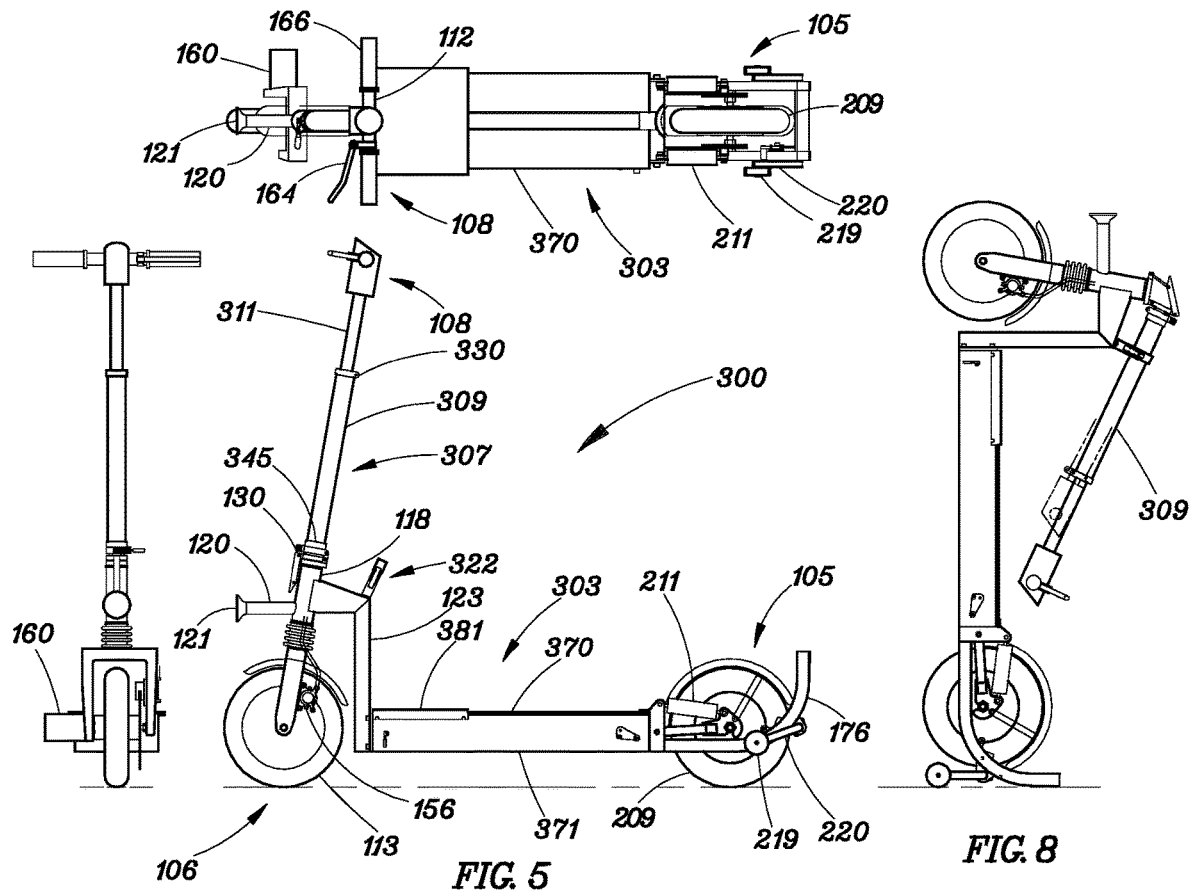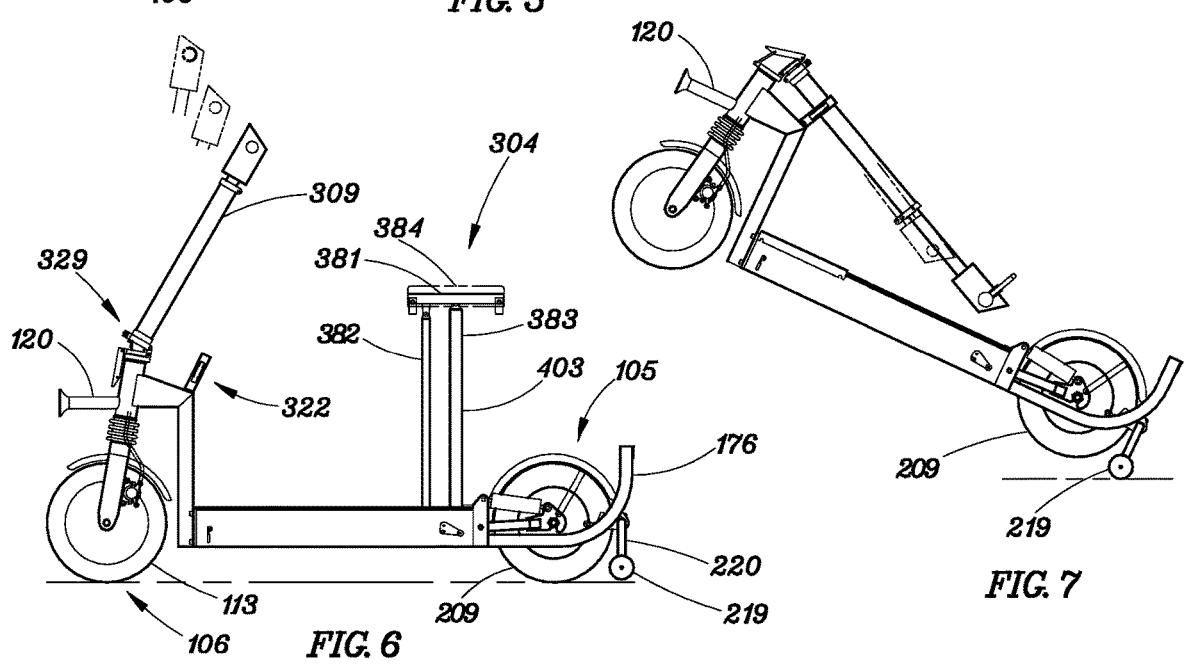

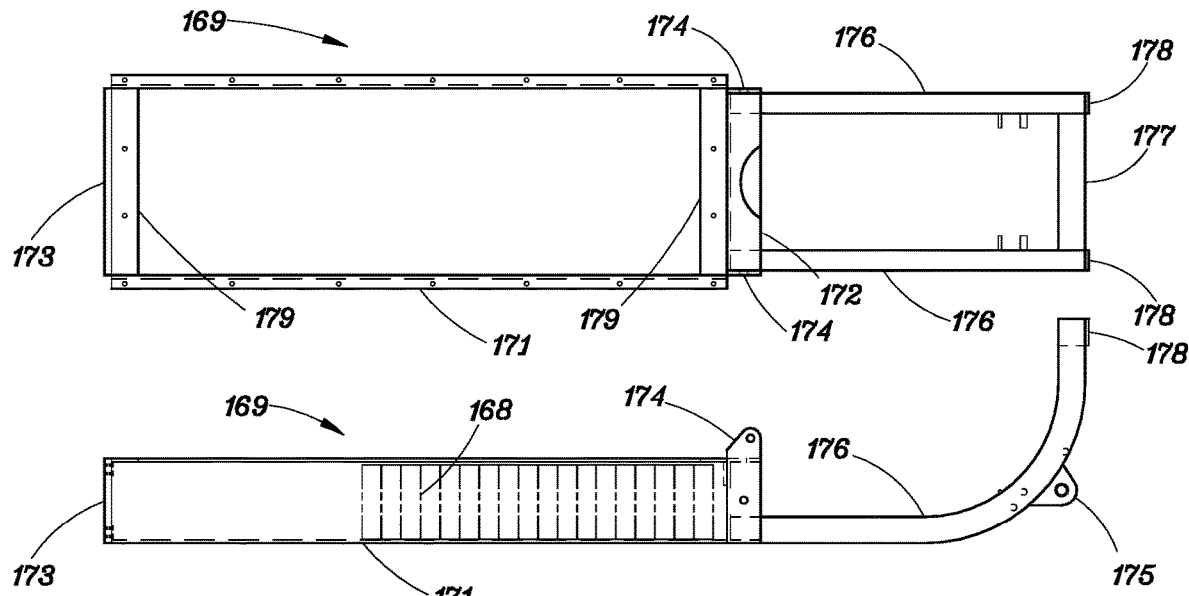
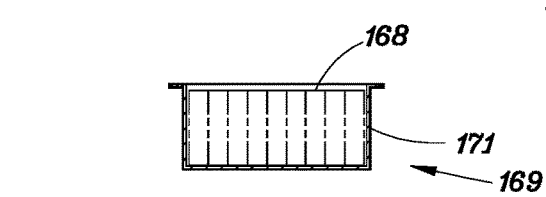
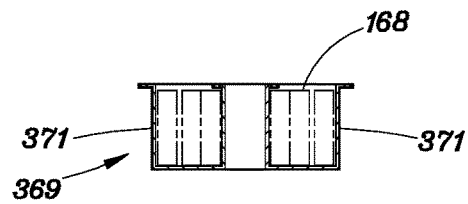
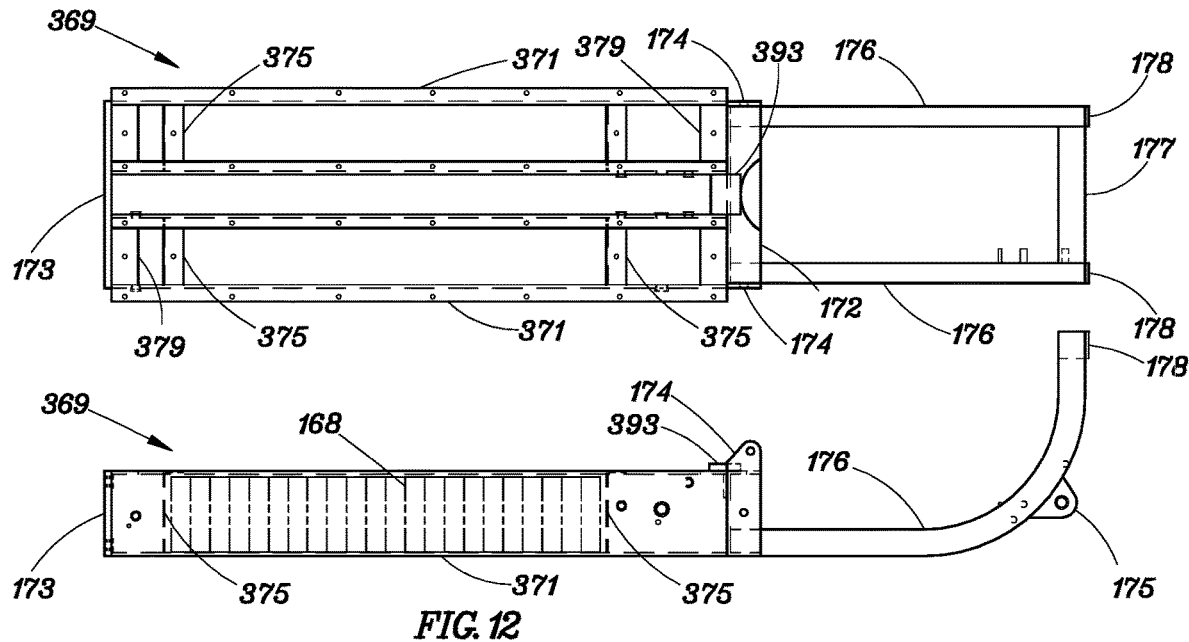

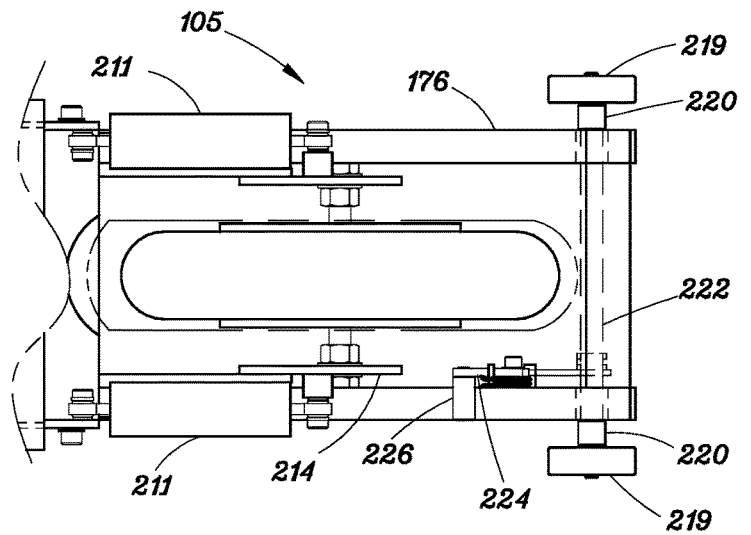
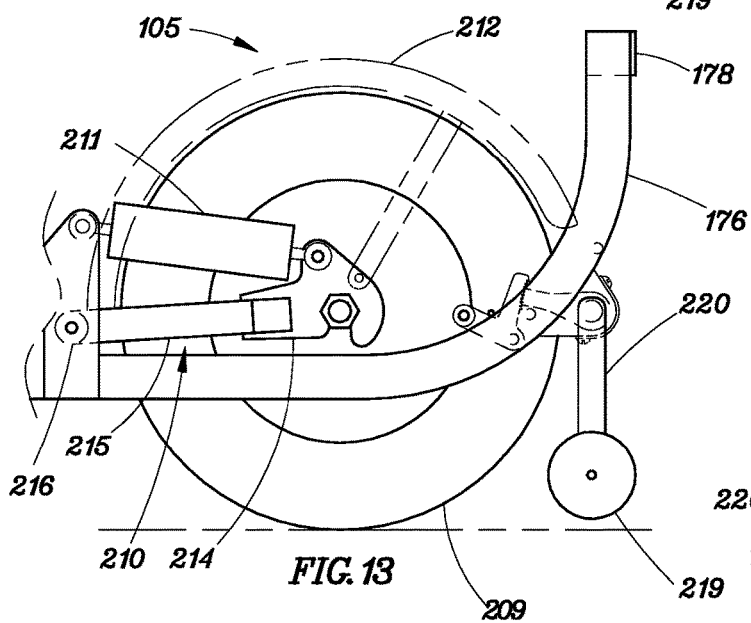
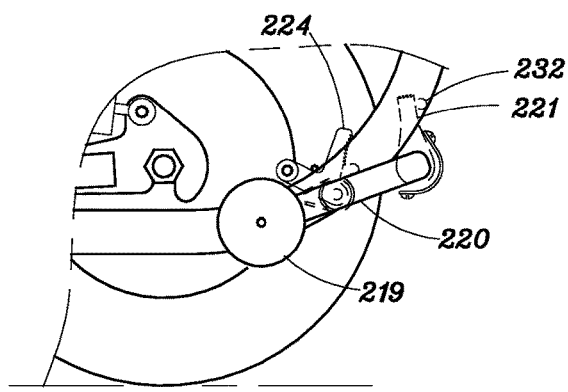
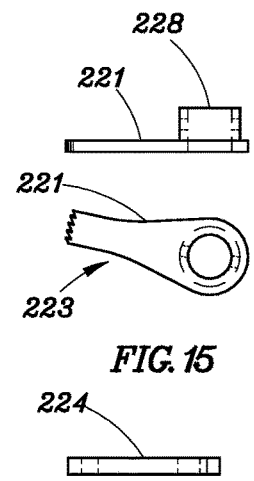
FIG. 15
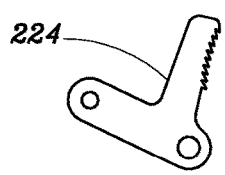
FIG. 16
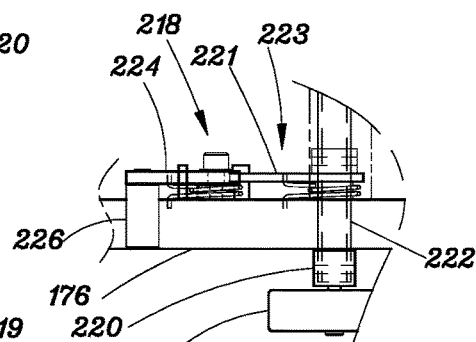
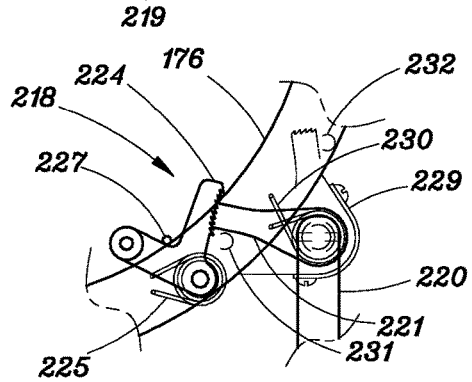
FIG. 14
FIG. 17

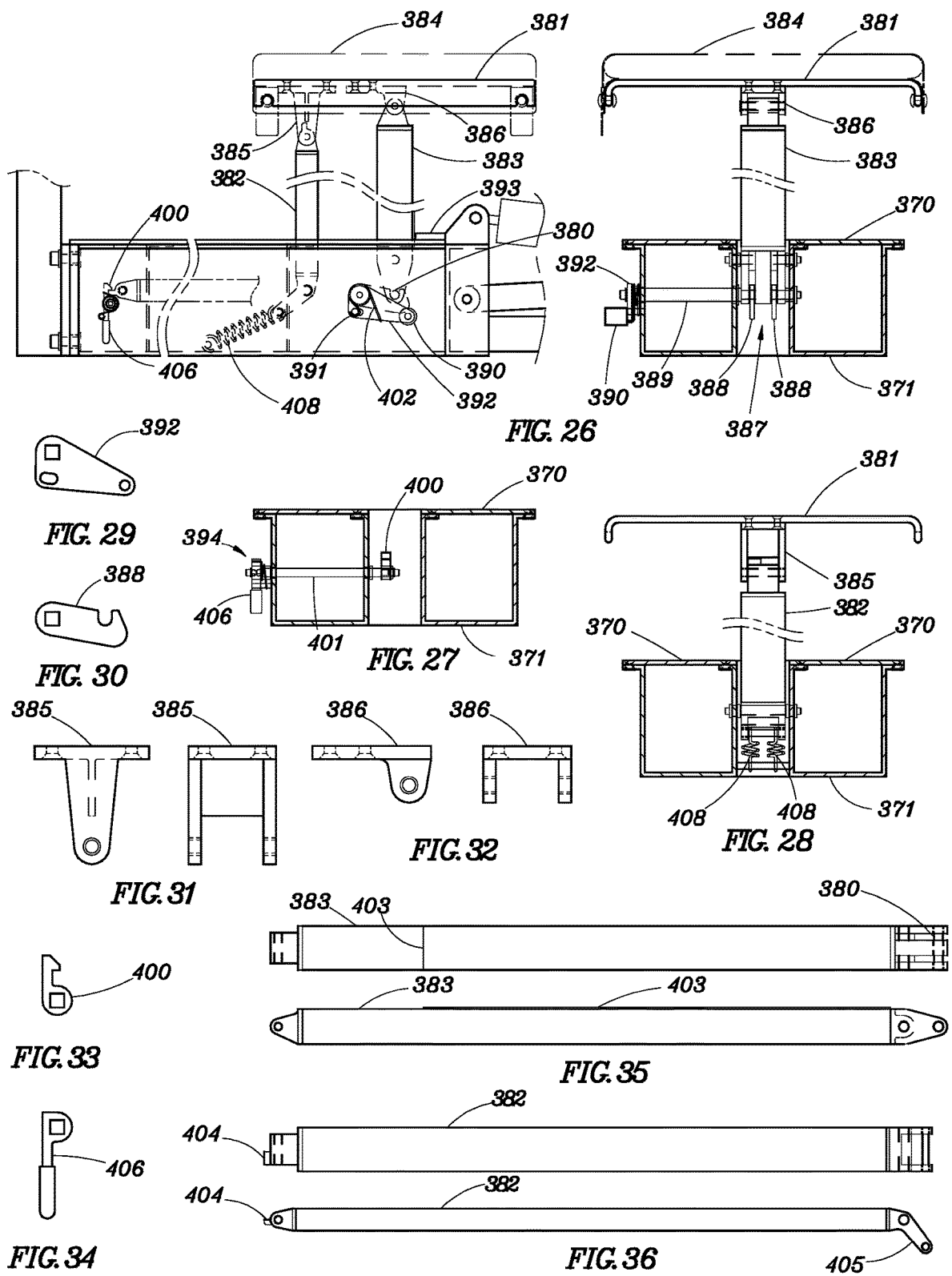

ELECTRIC SCOOTER

TECHNICAL FIELD

This invention relates to electric scooters with a pair of tandem wheels and a foldable handlebar stem.

BACKGROUND OF THE INVENTION

There are many kinds of electric scooters with a pair of small tandem wheels and foldable frames in the market. They all have great quality and performance. However, despite their compactness and portability, none of them has gained popularity, because every type has its own drawbacks. Standing-drive scooters are light enough for young person to hand carry, but the hand carry is tolerable only for a short distance. Some do provide a pair of dolly wheels to roll, saving efforts, but it takes time to setup to a rolling position. Besides, all these standing drive scooters can be only enjoyed by a few enthusiastic young people, who love the thrill of driving. Some models provide both standing and sitting drive with a detached seat, more suitable for majority of people, especially ladies and elderly. But they are relatively heavy, and take time to setup for sitting drive. Besides, they cannot be brought onto mass transportation, which many working people rely on for their daily trips.

BRIEF SUMMARY OF THE INVENTION

There is a great need to improve existing scooters. The most needed improvement is to make a scooter allowing to be pulled away at its parked position and vertically stand on the ground. In addition, a scooter should provide both standing and sitting drive with a quick changeover, allowing more people to take the advantage of its versatility and mobility, making their daily activity more efficient and enjoyable. Hopefully, the public would follow the trend, while helping save energy to fight the climate change.

A scooter needs a pair of swingable dolly wheels mounted at its rear end to work as a parking stand. At the parked position with its handlebar stem in a folded position, it can be pulled away by hand, and vertically standing using its dolly wheels and rear end of the deck frame to touch the ground, saving space in crowded places like buses or trains.

For a scooter capable of a quick change between standing and sitting drive, it needs a built-in seat. The seat is made of a flat plate and when resting on the deck plate of a scooter, it serves as a front part of the deck plate for standing drive. The seat has a pair of parallel supporting posts consisting of a front post and a rear. They are mounted in the middle of the deck frame. With the seat on the deck plate, both posts are laid horizontal with the front post positioned below the rear, and individually hinge on the seat with a bracket, and their rear end& hinge on the deck frame. As the parallel posts are raised to vertical placing the seat in the sitting drive position, the rear post will be automatically locked on the deck frame.

Another improvement needed for sitting drive is to make the position of the handlebar adjustable. A conventional telescopic handlebar stem can adjust the height of the handlebar and tilt on a folding joint to place in a folded position. In addition, the lower handlebar stem needs a novel tilt-adjusting joint to hinge on the folding joint, enabling to tilt the lower handlebar stem rearward in the same way as the folding joint does, and lock in selected positions. With both height and tilting adjustments, the handlebar can be set to any desired positions. Once the handlebar stern is unfolded from a folded position for driving; no adjustment on the handlebar stem is required, a useful feature for sitting drive, because every driver would set at a preferred position.

BRIEF DESCRIPTION OF THE DRAWINGS

FIG. 1 is an isometric view of the electric scooter of standing drive in the driving position.

FIG. 2 is a side view of the electric scooter of standing drive in the parked position.

FIG. 3 is a side view of the electric scooter of standing drive being pulled away from the parked position.

FIG. 4 is a side view of the electric scooter of standing drive vertically standing on the ground.

FIG. 5 is an isometric view of the electric scooter of standing-sitting drive in the driving position.

FIG. 6 is a side view of the electric scooter of standing-sitting drive in the parked position, setup for sitting-drive.

FIG. 7 is aside view of the electric scooter of standing-sitting drive being pulled away from the parked position.

FIG. 8 is a side view of the electric scooter of standing-sitting drive vertically standing on the ground.

FIG. 9 is a top view and side view of the deck frame on the scooter of FIG. 1.

FIG. 10 is a cross sectional view of the deck frame on the scooter of FIG. 1.

FIG. 11 is a cross sectional view of the deck frame on the scooter of FIG. 5.

FIG. 12 is a top view and side view of the deck frame on the scooter of FIG. 5.

FIG. 13 is a partial side view and top view of the rear end assembly at the parked position for both scooters shown in FIG. 1 and FIG. 5.

FIG. 14 is a partial side view of the rear end assembly at the driving position for both scooters shown in FIG. 1 and FIG. 5.

FIG. 15 is a side view and top view of the locking arm.

FIG. 16 is a side view and top view of the locking hook.

FIG. 17 is a partial side view and top view of the dolly wheel locking device.

FIG. 26 is a partial side view and cross sectional front view of the deck assembly with the seat in the sitting-drive position, on the scooter of FIG. 5.

FIG. 27 is a cross sectional view of the deck frame assembly showing the horizontal locking device on the scooter of FIG. 5.

FIG. 28 is a cross sectional front view of the deck frame assembly showing the front post on the scooter of FIG. 5.

FIG. 29 is a plan view of the release lever of the rear post locking device on the scooter of FIG. 5.

FIG. 30 is a plan view of the locking hook for the rear post an the scooter of FIG. 5.

FIG. 31 is a side view and front view of the seat hinging bracket for the front post on the scooter of FIG. 5.

FIG. 32 is a side view and front view of the seat hinging bracket for the rear post on the scooter of FIG. 5.

FIG. 33 is a plan view of the locking hook for the front post on the scooter of FIG. 5.

FIG. 34 is a plan view of the release lever for the front post on the scooter of FIG. 5.

FIG. 35 is a side view and top view of the rear post on the scooter of FIG. 5.

FIG. 36 is a side view and top view of the front post on the scooter of FIG. 5.

DETAILED DESCRIPTION OF THE INVENTION

Figure 18:
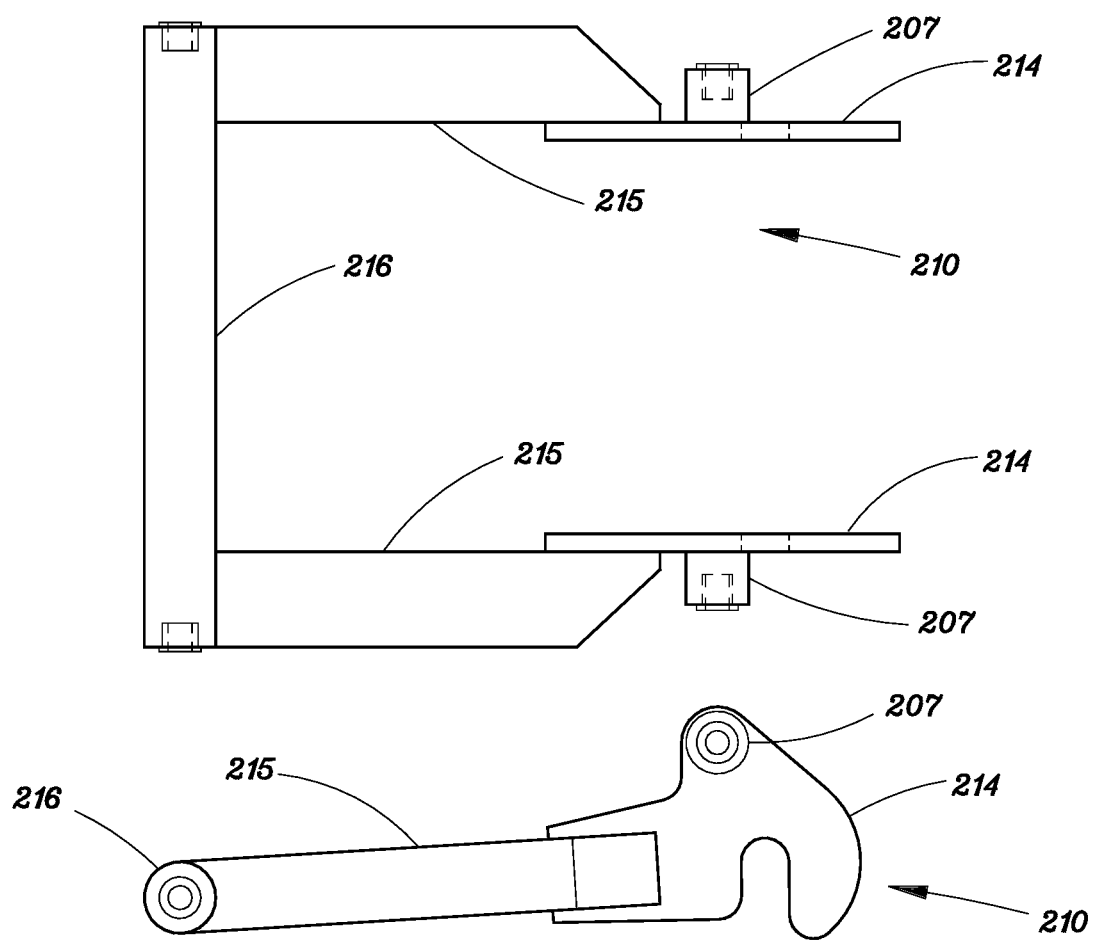
FIG. 18 is a side view and top view of the rear fork arm.

An electric scooter of standing drive is simpler and hence to be presented first, and then a scooter of standing-sitting drive next. Both types of scooter share many components, especially the front end and rear end of the scooters.

For low maintenance, both scooters will have an electric-gearless hub motor to drive the rear wheel, and a hand-operated disc brake on the front wheel. To make up the drawback of the motor's low staring torque and inefficiency at low speed, an electric drive is added to the front wheel to assist the scooter to start from stop without any need of kicking, a laborious action. Once the scooter has had a good start, the front wheel drive will be turned off.

As conventional, both wheels and all components are symmetrically positioned on a longitudinal vertical plane, unless otherwise stated. In order to make both scooters light, major structures are shown to be made with light weight alloys like aluminum, and hence holes for thread, pin, or shaft engagements are shown to have reinforcing inserts.

In the presentation, for components already existing in today's scooters; only major ones will be simply shown and briefly mentioned. Novel components are explained and depicted in details, but their designs are rudimentary, intended only for presenting the concept. Despite the pictorial illustration of many parts is neither correct nor to scale, in order to have an idea of what a new scooter looks like, some major dimensions of the scooters are shown to scale. Those dimensions are listed in the following.

Major Dimensions of Scooter Used in Pictorial Illustration

Both wheels 10 inches in diameter, their center distance 37.5 inches.

Rake angle of handlebar stem 10 degrees, height of handlebar from the ground 44.5 inches, handlebar stem tilting adjustment 20 degrees maximum.

Standing deck height from ground 6 inches, deck width 8 inches, deck frame thickness 3.25 inches.

Seat height; from ground 24.25 inches, from deck 18 inches (about the same as a household chair).

Seat: plate thickness 3/16 inches, longitudinal length 8 inches, width 9 inches.

Seat posts: lateral width 1.25 inches.

Scooter: overall length 49.25 inches, overall height 46 inches, overall width 14 inches.

Electric Scooter of Standing Drive

Major Assemblies of Standing-Drive Scooter

A standing-drive scooter 100 contains three major parts: a front end assembly, a deck assembly 103, and a rear and assembly 105.

Front End Assembly

The front and assembly consists of a front wheel assembly 106, a handlebar stem assembly 107, and a handlebar assembly 108.

Handlebar Assembly

Pictorial views are shown in FIG. 1.

The handlebar assembly 108 contains parts all conventional. It has a handlebar 112 with a twist type accelerator grip 166 mounted on the right side, a hand-brake lever 164 on the left, and a digital screen in the middle showing the needed information.

Front Wheel Assembly

Figure 21:
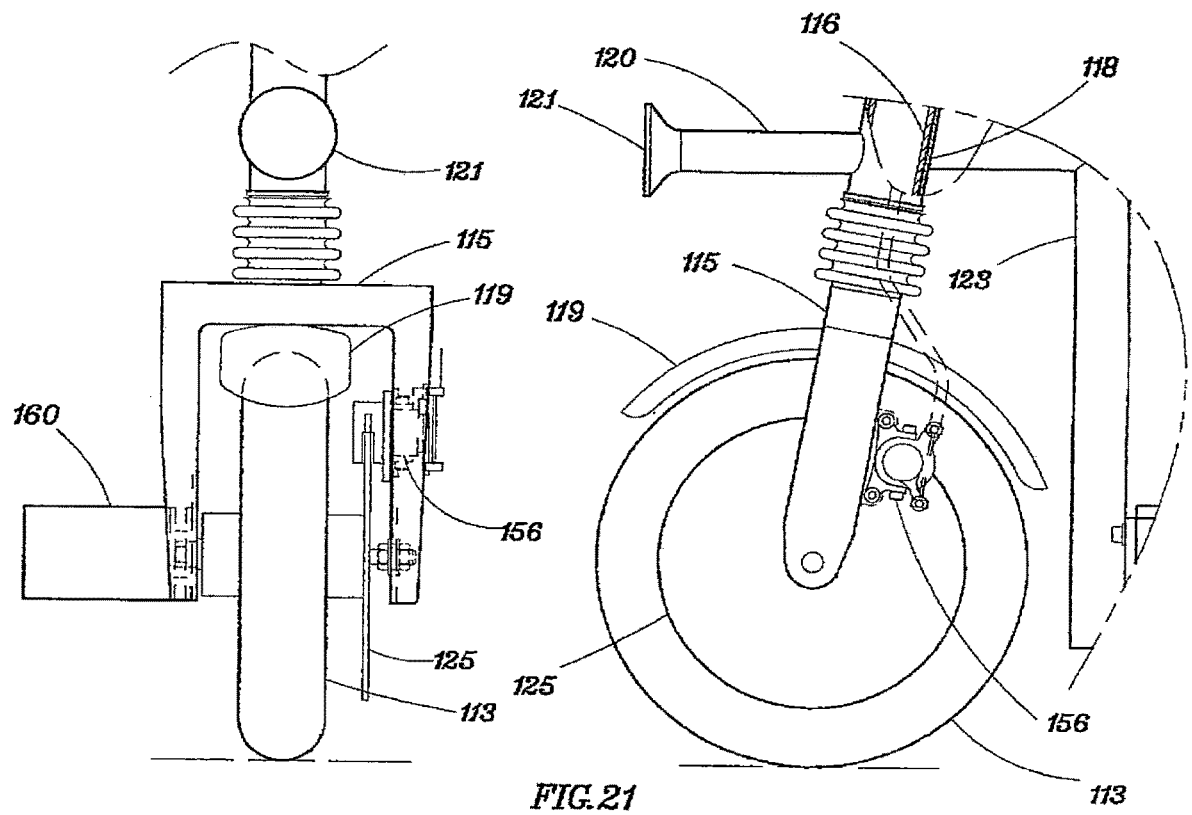
FIG. 21 is a partial side view and front view of the front wheel assembly on both scooters of FIG. 1 and FIG. 5, showing the hand brake and front wheel drive.

Pictorial views are shown in FIGS. 1 and 21.

The front wheel assembly 106 contains parts mostly conventional. It consists of a front wheel 113 with a hand-brake assembly, a fork arm 115 connected to the front wheel 113, a fork arm shaft 116 holding the fork arm 115, a shock absorber mounted in the fork arm shaft 116 for smooth ride, a head tube 118 holding the fork arm shaft 116, a wheel fender 119, a novel handle 120 mounted on the front face of the head tube 118, a head light 121 mounted at the front side of the handle 120, and a novel front wheel drive. A back beam 123 mounts on the rear side of the head tube 118 for connecting to the front end of the deck assembly 103 with bolts.

A special control must be added to the accelerator grip on the handlebar to do the following. When the accelerator grip is actuated to move the scooter from stop, it will turn on both the rear wheel drive and front wheel drive simultaneously until the scooter has a good start, the control will turn off the front wheel drive. In addition, when the scooter slows down during going uphill, the control will turn on the front wheel drive to assist. Therefore, with both drives, the scooter could be driven like an adult sitting-drive electric scooter.

For easy understanding, the following description of the front wheel assembly 106 is based on the fork arm shaft 116 in the vertical position, and the front, rear, left, and right of a location is based on the scooter.

Handlebar Stem Assembly

Pictorial views are shown in FIGS. 1 and 2.

The handlebar stem assembly 107 contains parts all conventional. It consists of a handlebar stem 109, a folding joint 128, and a holding latch 122. The handlebar stem 109 connects its upper end to the handlebar 112, and its lower end to the folding joint 128. The handlebar stem has a locking head 110 mounted on its rear side to engage with the holding latch 122. The folding joint 128 has folding hinge 129 on its rear side to tilt the handlebar stem rearward. On its front side, the folding joint 128 has a folding latch 130 connected a top flange 131 of the fork arm shaft 116. The holding latch 122 is mounted on a back beam 123 of the head tube 118 to hold the handlebar stem 109 in a folded position.

Hand Brake and Front Wheel Drive

Figure 22:
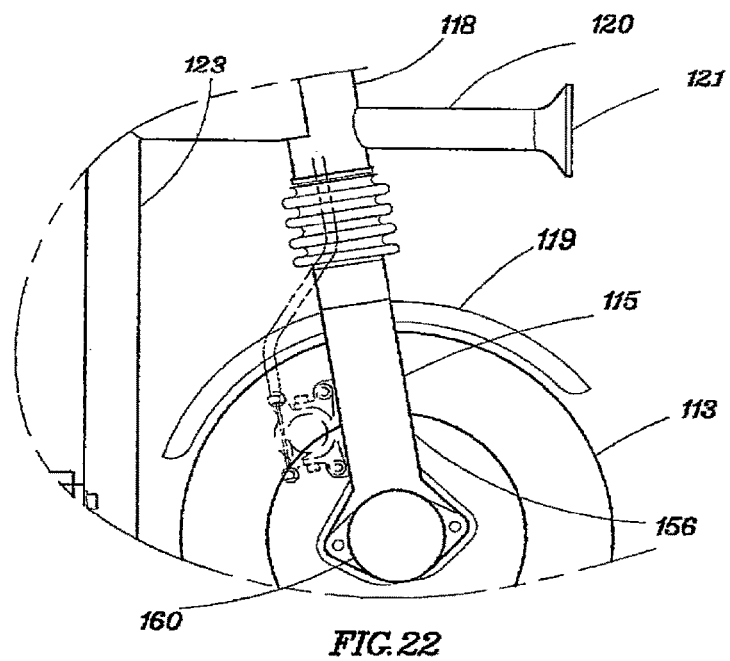
FIG. 22 is a partial right side view of the front wheel assembly on both scooters of FIG. 1 and FIG. 5, showing the hand brake device.
Figure 23:
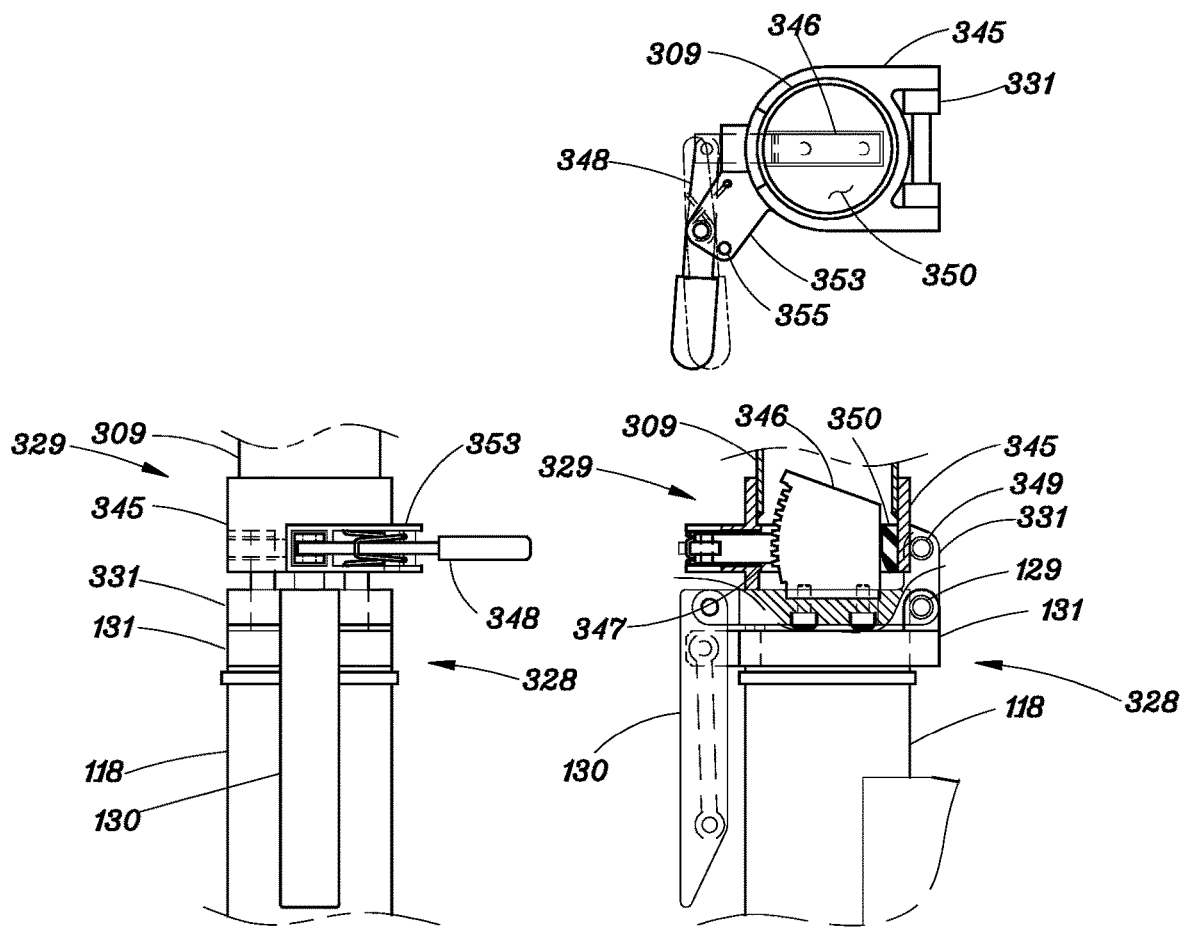
FIG. 23 is a partial isometric view of the folding joint and tilting joint on the scooter of FIG. 5. (For clarity, the head tube is shown in the vertical position.)
Figures 24, 25:
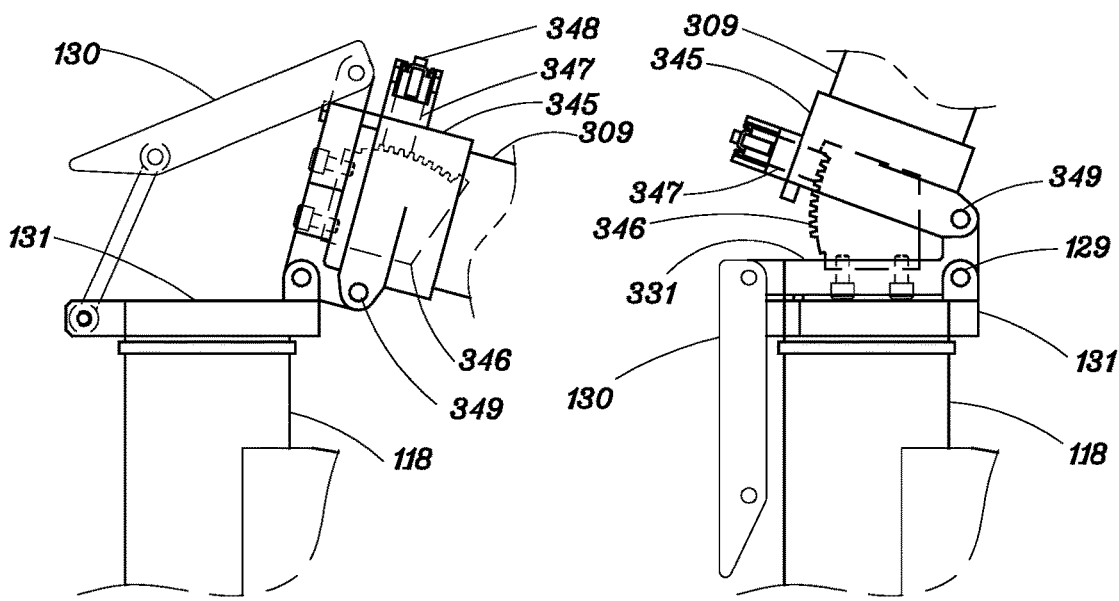
FIG. 24 is a partial side view showing the lower handlebar stem tilted on the folding hinge to a folded position, on the scooter of FIG. 5.
FIG. 25 is a side view showing the lower handlebar stem tilted on the tilting hinge to the maximum tilted position on the scooter of FIG. 5.

Pictorial views are shown in FIGS. 1, 21, and 22.

The hand brake assembly is conventional. It consists of a hand brake device 156 and a disk 125. The disk 125 is concentrically mounted on the left side of the front wheel axle, and the hand brake device 156 is mounted on the rear left side of the fork arm 115. The hand brake device 156 is remotely actuated by the hand brake lever 164 on the handlebar 112. The front wheel drive contains a geared electric motor 160 mounted on the right side of the fork arm, and its output shaft has a one-way clutch engaging with the front wheel axle. The function of the front wheel drive has been mentioned in the section of front wheel assembly. The direct current geared motor 160 has high starting torque, and hence its size could be small. Besides, it has one-way clutch to engage with the front wheel, so it does not waste any energy when the rear wheel motor alone is driving, and hence it should be able to last without any maintenance.

Standing Deck Assembly

Pictorial views are shown in FIGS. 1, 9, and 10.

The deck assembly 103 comprises a deck frame 169 and a deck plate 170 with anti-skid surface. The deck frame 169 is a weldment made of light weight alloys. It consists of a longitudinally-laid deck beam 171, a front plate 173, a lateral channel beam 172, two side plates 174, a pair of tail beams 176, a rear beam 177, two lateral edge plates 179, and a pair of shaft-mounting brackets 175.

The deck beam 171 has a channel cross section with the opening on the upper face. Both upper edges individually have an outward flange for mounting the deck plate 170. Battery packs 168 and necessary components are mounted inside the deck beam 171. The upper flange of the lateral channel beam 172 has a round cut in the middle at its rear edge to provide space for the rear wheel fender.

The tail beams 176 individually locate on each side of the rear wheel. The front part of each tail beam 176 is horizontal and its rear part is vertical, with a bend in the middle. The rear beam 177 could be square tubing with light-reflecting signal stickers placed on its rear face, or a channel beam with the open face at the rear side for mounting electrical signals inside.

The front plate 173 of the deck frame 169 connects to the back beam 123 of the head tube 118 with bolts. The deck plate 170 mounts on the top of the deck beam 171 with screws. There are two anti-skid pads 178 individually mounted on the rear end of the tail beams 176, at their rear face, for engaging with the ground when the scooter is vertically standing.

Rear End Assembly

The rear end assembly 105 consists of a rear wheel assembly 208 and a parking assembly.

Rear Wheel Assembly

Pictorial views are shown in FIGS. 1, 13, 14, and 18.

The rear wheel assembly 208 consists of a rear wheel 209, a rear fork arm 210, a pair of shock absorbers 211, and a wheel fender 212. The rear wheel 209 is directly driven by a gearless hub motor mounted in its hub. The rear fork arm 210 is a weldment. It consists of a pair of axle plate 214, a pair of hinging beams 215, two round stubs 207, and a front beam of round tubing 216. Both axle plates 214 are individually located on each side of the rear wheel 209 and have an open slot below with a round end to mount the axle of the rear wheel 209. The hinging beams 215 individually connect their rear end to the axle plates 214, and their front end to the ends of the front beam 216. One of the round stubs 207 mounts on the outer face of each axle plate 214 for mounting one of the shock absorbers 211. Both ends of the front beam 216 individually hinge on the side plates 174 on the deck frame 169. The shock absorbers 211 are individually located on each side of the rear wheel 209, above the rear fork arm 210, and their rear end individually hinges on the round stub 207 and their front end on the side plate 174 on the deck frame 169. The rear fork arm 210 could be made into a stronger and lighter single piece, with die casting.

Parking Assembly

The parking assembly 213 comprises a dolly wheel assembly and a dolly-wheel locking device 218.

Dolly Wheel Assembly

Pictorial views are shown in FIGS. 13 and 14.

The dolly wheel assembly consists of a pair of dolly wheels 219, a pair of dolly arms 220 of rectangular beam, and a laterally-laid arm shaft 222 of round tubing. The arm shaft 222 is located behind the rear wheel 209 and hinges on the pair of brackets 175 on the tail beams 176 of the deck frame 169. The following description is based on the dolly wheels 219 touching ground to place the scooter in a parked position and the dolly arms 220 are vertical. The lower end of each dolly arm 220 pivotally mounts a dolly wheel 219 on its outer side. Its upper end has a blind hole on its inner side to lock to one end of the shaft 222, with a pin. The dolly arms 220 rest individually on the outer faces of the brackets 175 to laterally hold themselves in place. By swinging the dolly arms 220 forward to a stored position, the scooter is set for driving. There is a lateral cover beam 229 mounted on the brackets 175 to protect the arm shaft 222 from behind.

Dolly Wheel Locking Device

Pictorial views are shown in FIG. 13-17.

The dolly wheel locking device 218 has a locking arm 223 and a locking book 224. The locking arm 223 is made of a locking plate 221 and a bushing 228. The locking arm 223 is located between the rear wheel 209 and the left tail beam 176, and locked to the arm shaft 222, with a pin through its bushing 228. At its front side, the locking plate 221 has a circular edge with latching teeth concentric to the arm shaft 222. Each latching tooth is triangular with one engaging edge pointing in radial direction or slightly pointing to the trail side, and a slanted edge trailed behind. The trailing side is the direction where the dolly arms 220 swings forward.

The locking hook 224 is located at the front side of the locking plate 221 and hinges on the left tail beam 176. The locking hook 224 has teeth on its rear edge to engage with the locking plate 221. Its hinge should be located on the tangent line drawn from the pitch radius of the teeth at the middle of the locking plate 221. The locking hook 224 has a spring 225 to hold it in the engaging position, and a roller 226 mounted at its front, above the left tail beam 176, for releasing it from engagement. And it has a stop pin 227 mounted on the left tail beam 176 to hold it near the engaging position after disengagement.

By pressing the roller 226 until it stops against the left tail beam 176, the locking hook 224 will disengage with the locking plate 221. And a spring 230 mounted on the locking plate 221 rotates the shaft 222 to swing the dolly arms 220 forward until the locking plate 221 is stopped bf a pin 232 mounted on the tail beam, placing the dolly arms 220 in a stored position, allowing the scooter to be driven.

By kicking the left dolly wheel 219 to swing down the dolly anus 220 from their stored position to park the scooter, the locking plate 221 will be stopped by a pin 231 mounted on the tail beam 176. At the parked position, the dolly wheels 219 should be slightly above the ground, and the scooter will tilt slightly with one of the dolly wheel 219 landed on the ground, like a conventional kickstand.

At the parked position with the handlebar stem in a folded position, the scooter can be rolled away by hand pulling on the handle 120 at the head tube 118. At the same position the scooter can also stand vertically using the dolly wheels 219 and tail beams 176 to engage on the ground, saving space in crowded areas. If the scooter's center of gravity is much higher or lower, the end of the tail beams 176 should be relocated.

Electric Scooter of Standing-Sitting Drive

Major Assemblies of Electric Scooter of Standing-Sitting Drive

An electric scooter of standing-sitting drive 300 contains three major parts: a front end assembly, a standing deck assembly 303 including seat assembly 304, and a rear end assembly 105. Their relative positions are the same as the standing-drive scooter 100. The tandem wheels and all components are symmetrically positioned on a longitudinal vertical plane, unless otherwise stated.

Front End Assembly

The front end assembly consists of a front wheel assembly 106, a handlebar stem assembly 307, and a handlebar assembly 108.

Handlebar Assembly

Pictorial views are shown in FIG. 5.

The handlebar assembly is the same as the assembly 108 on the standing-drive scooter 100.

Front Wheel Assembly

Pictorial views are shown in FIGS. 5, 21 and 22.

The front wheel assembly is the same as the assembly 106 on the standing-drive scooter 100.

Handlebar Stem Assembly

Pictorial views are shown in FIGS. 5, 23, 24, and 25.

The handlebar stem assembly 307 consists of an upper handlebar stem 311, a lower handlebar stem 309, a folding joint 328, a tilting joint 329, a clamp 330, and a holding clamp 322. The engagement between the upper handlebar stem 311 stem and lower handlebar stem 309 is conventional. The upper handlebar stem 311 connects its upper end to the handlebar 112 and its lower end engages in the upper end of the lower handlebar stem 309. The clamp 330 mounts on the upper end of the lower handlebar stem 309 to clamp on the upper handlebar stem 311 for the handlebar's height adjustment. The lower end of the lower handlebar stem 309 connects to the tilting joint 329. The tilting joint 329 hinges its rear end on the upper side of the folding joint 328. The function of the folding joint 328 is the same as the folding joint 128 on the scooter 100. The folding joint 328 has a fold disk 331. The fold disk has a folding hinge 129 at its rear side, hinging on the flange 131 of the fork-arm shaft 116, and has a folding latch 130 at its front side connecting to the flange of 131. With the latch 130 released, the lower handlebar stem 309 can be tilted and held by the holding clamp 322 in a folded position.

Holding Clamp of Lower Handlebar Stem Assembly

Figures 19, 20:
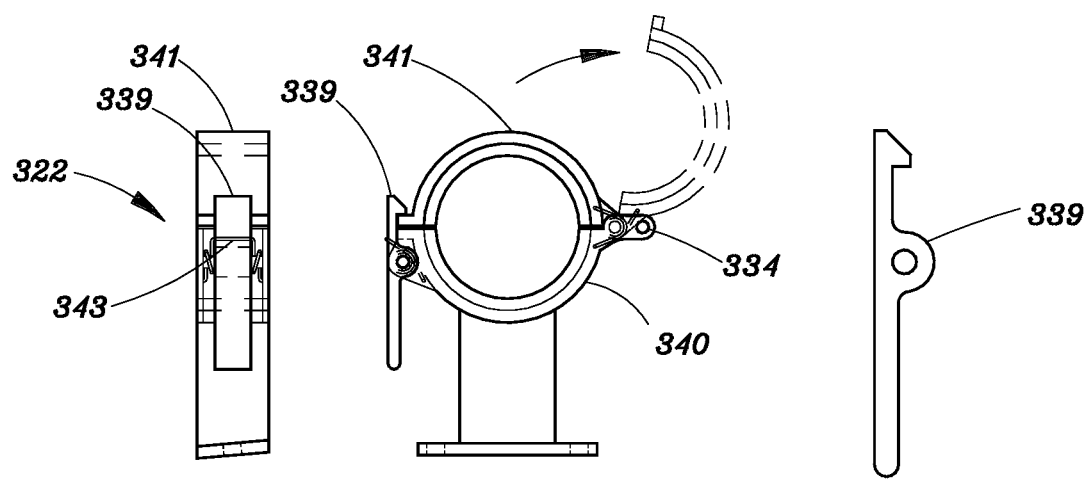
FIG. 19 is a side view and front view of the lower handlebar stem holding clamp on the scooter of FIG. 5.
FIG. 20 is a plan view of holding clamp locking hook on the scooter of FIG. 5.

Pictorial views are shown in FIGS. 5, 19, and 20.

The holding clamp 322 is to hold the lower handlebar stem 309 in a stored position after being released from the folding joint 328. The clamp 322 consists of a locking hook 339, a lower half-round clamp 340, and an upper half-round clamp 341. The lower clamp 340 has a frame mounted on the upper face of the back beam 123 of the head tube 118. The two clamps 340, 341 hinge together on the right side and lock together on the left side by the locking hook 339. In the locked position, the two half clamps form a circular hole to hold the lower handlebar stem 309 inside. Their inner fac has a layer of soft liner to accommodate the lower handlebar stem 309 at different tilt-adjusting angles.

Looking toward the axis of the clamps from the rear, both half clamps 340, 341 have a laterally-protruded end on their left side. The upper face of the protruded part on the upper clamp 341 is for engaging with a locking book 339. The locking action of the hook 339 is conventional. It has an engaging face and a slanted, enabling to lock the upper clamp 341 by spring force as the B upper clamp closes in. The book has a spring 343 to hold it in engagement. The protruded end of the lower half-round clamp 340 is positioned close to the hook at the engaged position to hold the hook after disengagement. By pressing the lower end of the hook 339 to disengage, the upper clamp 341 will open by a spring mounted on its hinge and hold at an open position by a pin 334 mounted on the lower clamp.

Tilting Joint of Lower Handlebar Stem Assembly

Pictorial views are shown in FIGS. 6, 23, 24, and 25.

The tilting joint 329 mainly consists of a circular collar 345, a tooth sector 346, a locking bar 347, and a tilting lever 348. The following description is based on the head tube 118 in the vertical position. The circular collar 345 secures the lower end of the lower handlebar stem 309 inside. The circular collar 345 has a tilting hinge 349 on its rear side, hinging on the fold disk 331 at a location above the folding hinge 129, enabling the lower handlebar stem 309 to tilt rearward the same way as the folding joint 328 does, and then lock to selected angles, placing the handlebar 112 in comfortable driving positions.

The tooth sector 346 is made of hardened alloy and has a uniform thickness on its front face and bottom face. Its bottom is placed in a recess on the upper face of the fold disk 331 and secured with screws. The front face of the tooth sector 346 is circular with a center located at the tilting hinge 349, and has locking teeth on the circular periphery for adjusting tilting angles of the lower handlebar stem 309. To cover the end of the circular collar around the tooth sector 346, a cover 350 made of soft materials is bonded to the inside face of the circular collar 345.

The front side of the circular collar 345 has a square hole longitudinally laid at the same elevation of the tilting hinge 349. The square hole is reinforced with a hardened liner to engage with the locking bar 347. The rear end of the locking bar 347 has locking teeth to engage with the tooth sector 346, holding the lower handlebar stem 309 in place for driving. The front end of the locking bar 347 has a horizontal open slot and secures a vertical pin through the slot walls.

The tilting lever 348 is made of flat plate and has its right and placed inside the slot of the locking bar 347 to hinge on the vertical pin. The tilting lever 348 extends to the left and hinges its middle part on a fork bracket 353 protruded from the circular collar 345, with a vertical pin, and has a spring holding it.in the engaged position. The left end of the tilting lever 348 is a lever with a soft cover. By simply pulling the lever rearward till it hits a stop pin 355 mounted on the fork bracket 353, the locking bar 347 will be completely disengaged with the tooth sector 346, enabling the lower handlebar stem 309 to tilt to any desired angles and then lock in position.

Standing Deck Assembly

Pictorial views are shown in FIGS. 5, 11, 12, 26, 27, and 28.

The deck assembly 303 consists of a deck frame 369 and a pair of deck plates 370 with anti-skid surface. The deck frame 369 is the same as the deck frame 169 on the standing-drive scooter 100, except it has a pair of deck beams 371 replacing the deck beam 171 on the scooter 100. The connection of the deck assembly 303 to the front wheel assembly and rear end assembly is also the same as in the scooter 100.

The pair of deck beams 371 has a longitudinal space between them for mounting seat support. Each deck beam 371 has a cross section of channel shape with the opening on the upper face. The outer upper edge has an outward flange, and the inner upper edge has an inward flange. Both flanges are for mounting a deck plate 370 with screws. Battery packs 168 and necessary components are mounted inside both deck beams 371. Each deck beam 371 has two lateral edge plates 379 and two partition walls 375. The partition walls 375 provide a waterproof middle section for the battery packs, avoiding shaft holes located at the front and rear sections of the deck beam 371. The front plate 173 connects to the back beam 123 of the head tube 118 with bolts.

Seat Assembly

Pictorial views are shown in FIG. 6, 26-36.

The seat assembly 304 primarily consists of a seat 381 and a pair of supporting parallel posts. The seat 381 is made of a flat plate with around bend on its longitudinal sides. It could have a removable cushion 384 for sitting comfort. To secure the cushion 384 on the seat, the cushion has four neck buttons, one located at each of its longitudinal four corners, to engage individually with four open slots located on the seat 381 as shown in FIG. 26.

The pair of parallel posts is placed in the longitudinal space between the pair of deck beams 371. The parallel posts are a front post 382 and rear post 383. Both posts have the same length and lateral width. The posts have two positions: a horizontal when the seat 381 is working as a front part of the standing deck, and a vertical for sitting drive. For easy understanding, the locations of parts or places are to be identified literally based on the positions of the posts. For example, when the rear post is in the vertical position, its upper hinge and front face are as literally said. But when the rear post is in the horizontal position, its upper hinge is stated as front hinge, and its front face as lower face.

With the seat 381 resting on the deck plates 370, both posts are horizontal and located under the seat with the front post 382 positioned below the rear post 383. The posts have their front end individually hinging on the seat 381 with a bracket 385 for the front post 381 and a bracket 386 for the rear post 383, and their rear ends hinge individually on the inner walls of the deck beams 371. The rear post 383 mounts a deck strip 403 on its upper face, working as part of the standing deck.

Both posts 382, 383 are made of light-weight alloy with die-cast ends for hinging joints. Bach hinging hole should have a reinforcing bushing Seat Vertical Locking Device Pictorial views are shown in FIGS. 26, 29, 30, and 35.

A vertical locking device is to lock the rear post 383 on the deck beams 371 for sitting drive. The following description is based on the rear posts 383 in the vertical position and locked in place. The rear post 383 has two longitudinal slots vertically located below its lower hinge, and secures a lateral locking pin 380 in the slot walls. Two identical locking hooks 388 are individually positioned inside the slots. At its rear end, each locking hook 388 has an open slot with a round end to engage with the locking pin 380 from below. At the same elevation of the locking pin 380, the front ends of locking hooks 388 are individually secured to the right end of a locking shaft 389, which has its left end secured to a release lever 392 located on the left side of the left deck beam 371. The locking shaft 389 hinges on the deck beams 371. The engagement between the locking shaft 389 and both locking hooks 388 and the release lever 392 is that the locking hooks 388 and release lever 392 have a square hole and the shaft has a square cross-section individually on the location of the engagement.

On the rear side behind the open slot, each locking hook 388 has a slope edge. As the rear post 383 is raised to the vertical position, the locking pin 380 will push the locking hook 388 away first and then the locking hook 388 swings back by spring force to lock the pin 380.

The release lever 392 has a spring 402 to hold the locking hooks 388 in the engaged position and a roller 390 at its rear end. The release lever 392 has a circular slot centering on the shaft 389 and located below it. A stop pin 391 mounts on the left deck beam 371 and engages in the slot. In the locked position, the front end of the slot stops at the stop pin 391, holding the locking hooks 388 in the engaging position. By pressing the roller 390 downward until the release lever 392 stop at the other end of the slot, both locking hooks 388 will disengage with the rear post 383, allowing the seat 381 to be tilted down to the deck position.

There is a stop plate 393 mounted on the deck frame 369 to help stop the rear post 383 from behind, at the engaging position. After the rear post is locked, the stop plate 393 maintains a small gap with the rear post and hence no interference on the locking action.

Seat Horizontal Locking Device

Pictorial views are shown in FIGS. 26 and 27.

A horizontal locking device 394 is to hold the seat 381 and supporting pots, when the seat 381 is at the deck position. With the posts in the horizontal position, the front end of the front post 382 has a protruded head 404. The upper side of the protruded head is an engaging face and in line with the centerline of the front post 382. A locking hook 400 to engage with the protruded head from above has the same design as the hook 339 on the holding clamp 322. The locking hook 400 secures its lower end to the right end of a locking shaft 401. The locking shaft 401 hinges on the deck beams 371, below the engaging face, and its left end secures a lever 406 located on the outside of the left deck beam 371. The lever has a spring to hold the locking hook 400 in the engaged position. By pressing the lever 406 rearward, the locking hook 400 will be disengaged, allowing the seat 381 to be raised to the sitting position.

Seat Weight-Balancing Springs

Pictorial views are shown in FIGS. 26 and 28.

In order to handle the seat 381 safely and easily during changing the seat's positions between standing drive and sitting drive, the weights of the seat and supports have to be balanced. The following description is based on the seat in the sitting drive position, and the posts are vertical. The lower hinge of the front post 382 has a protruded head 405 to connect a pair of tension springs 408 with a pin. And the other end of the springs 408 anchors on the inner wall of the deck beams 371 with a pin. The pair of springs 408 is lined up close to the lower hinge of the front post 382 at the rear side of the hinge. As the seat is lowering toward the front, both spring's tensile force and offset from the lower hinge will increase to create more moment counteracting that of the seat and posts.

Rear End Assembly

Pictorial views are shown in FIG. 13-17.

The rear end assembly of the standing-sitting drive scooter 300 is the same as the rear end assembly 105 of the standing-drive scooter 100.

This concludes the detailed description of both scooters 100 and 300. While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An improved electric scooter of standing drive having, a front wheel assembly, a handlebar assembly, a handlebar stem assembly, a deck frame assembly, and a rear wheel assembly, and said front wheel assembly containing a front wheel with a disk hand braking device, a fork arm, a fork arm shaft and a head tube, and said handlebar assembly having a handlebar with an accelerator grip mounted on the right side and a hand braking lever mounted on the left side, and said handlebar stem assembly having a folding joint with a folding hinge to tilt said handlebar stem rearward, and a folding latch to lock to said fork arm shaft, and said deck frame assembly having a deck frame, and said rear wheel assembly containing an electric-driven rear wheel, wherein the improvement comprises;

a handle mounted on the front side of said head tube, a pair of tail beams mounted on said deck frame, one positioned on each side of said rear wheel and extending to the end of said rear wheel, a pair of dolly wheels individually positioning on outer sides of two dolly arms and laterally hinging on the lower ends of said dolly arms, and both dolly arms individually secured at their upper end to ends of a laterally-laid shaft, and the shaft is located behind the rear wheel and hinges on said tail beams, with both dolly arms positioned individually on outer faces of the tail beams, and a locking device mounted on an inner side of the left tail beam to engage with said shaft, enabling to lock said shaft to set both dolly arms in a vertical position allowing both dolly wheels to touch ground, placing said scooter in a parked position, and with said lower handlebar stem assembly in a stored position, said scooter allowing to be rolled away by hand pulling on said handle, and vertically standing using said dolly wheels and the ends of both tail beams to touch the ground, and by unlocking said locking device, allowing said dolly arms to swing forward by spring force to a stored position, placing said scooter in a driving position.

2. The improved electric scooter of standing drive as cited in claim 1 wherein said locking device further comprises a locking arm and a locking book, and said locking arm mounts its rear end on said shaft, and has a circular sector on its front side, centering on said shaft, and the circular sector has locking teeth on the periphery, and said locking hook hinges on said left tail beam and has a circular edge an its rear side with locking teeth to engage with the locking arm, and a spring to hold it in engagement, and the locking hook can be disengaged by pressing down a roller mounted on its front side.

3. The improved electric scooter of standing drive as cited in claim 1 further comprises an electric drive to said front wheel for assisting said scooter to start from stop and when slowing down during going uphill.

4. An electric scooter of standing-sitting drive comprises;

a front wheel assembly, a handlebar assembly, a handlebar stem assembly, a deck frame assembly with a seat assembly, a rear wheel assembly, and a parking assembly, and said front wheel assembly contains a front wheel with a hand brake device, a front wheel electric drive only for starting and going uphill, a fork arm with a fork arm shaft, and a head tube with a back beam, and said handlebar assembly contains a handlebar with a hand accelerator and a hand brake lever, and;

said handlebar stem assembly contains an upper handlebar stem, a lower handlebar stem, a clamp, a folding joint, a tilting joint, and a holding clamp, and said upper handlebar stem has its upper end supporting the handlebar, and said clamp mounts on the upper end of the lower handlebar stem and engages with the lower end of the upper handlebar stem for height adjustment of said handlebar assembly, and said folding joint is located at the lower end of the handlebar stem assembly and has a folding hinge located at its rear side, hinging on the upper end of said fork arm shaft, and a folding latch at its front side connecting to the fork arm shaft, and said tilting joint connects its upper side to the lower end of the lower handlebar stem, and its lower rear side has a tilting hinge to hinge on the upper rear side of said folding joint, above said folding hinge, enabling to tilt said lower handlebar stem rearward and lock in selected positions, and said holding clamp mounts on the back beam of said head tube to hold the lower handlebar stem in a folded position, and said deck frame assembly contains a deck frame and a pair of deck plates, and said deck frame connects its front end to the back beam of the front wheel assembly, and said deck plates mount on the top of the deck frame, working as a standing deck for standing drive, and said seat assembly mounts on the deck frame and contains a seat of a flat plate supported by a pair of parallel posts, and the seat has two positions, one resting on the deck plates to work as a front part of the standing deck for standing drive, and another as a seat for sitting drive, and the pair of parallel posts consists of a front post and a rear post, and is placed in a longitudinal space in the middle of the deck frame, and when the seat rests on the deck plates, both parallel posts are horizontal with the front post positioned below the rear post, and have their front ends rear ends individually hinged on the seat with brackets and their rear ends hinged on the deck frame, and a vertical locking device to automatically lock the seat in the sitting drive position, as the parallel posts rise to the vertical position, and a horizontal locking device to automatically lock the seat on the deck plates for the standing drive, as the parallel posts tilt down to the horizontal position, and said rear wheel assembly contains an electric-driven rear wheel, a rear fork arm, and a pair of shock absorbers, and both rear fork arm and shock absorbers individually connect to the rear end of the deck frame, and said parking assembly consists of a dolly wheel assembly and a locking device, and the dolly wheel assembly consists of a pair of dolly wheels, a pair of dolly arms, and a laterally-laid shaft, and the dolly wheels individually hinge on the lower ends of the dolly arms, and the upper ends of the dolly arms individually secure to ends of the shaft, and the shaft is located behind the rear wheel and hinges on a pair of tail beams of the deck frame, and said locking device mounts on an inner side of the left tall beam and locks the dolly arms at the vertical position to park the scooter, and with the lower handlebar stem in the folded position and the seat positioned on the deck plates, the scooter can be rolled away by hand pulling on a handle mounted on the head tube of the front wheel assembly and vertically stand using the tail beams and dolly wheels to engage with the ground, and by releasing the locking device, the dolly arms will be raised forward and locked at a stored position, setting the scooter in the driving position.

5. The electric scooter of standing-sitting drive as cited in claim 4 wherein said vertical locking device further comprises a protruded and of the rear post below its rear hinge, two identical locking hooks, a locking shaft, a lever, and a spring, and said protruded end has two longitudinal slots and a lateral pin secured in walls of the slots, and the locking hooks have their rear ends individually positioned in the slots and have an open slot to engage with the pin from below, and their front ends are secured to the right end of the locking shaft located at the same elevation of the pin, and the locking shaft hinges on the deck frame and has its left end secured to the front end of said lever located outside of the deck frame, and the spring forces the lever to place the locking hooks in engagement with the pin, enabling to hold the seat in the sitting drive position, and by pressing the rear end of the lever downward, the locking hooks will disengage with the pin, enabling the parallel posts to tilt forward to place the seat on the deck plates.

6. The electric scooter of standing-sitting drive as cited in claim 4 wherein said horizontal locking device further comprises a protruded head on the front hinge of the front post, a locking hook, a locking shaft, a lever, and a spring, and said protruded head at its upper side has an engaging face in line with a centerline of the front post, and the locking hook positions in front of the protruded head and has a face to engage with the engaging face of the protruded head from above, and the bottom of the locking hook secures to the right end of said locking shaft, and the locking shaft hinges on the deck frame, and its left end secures to the lever positioned outside the deck frame, and the spring mounts on the lever to force the locking hook in engagement with the protruded head, and as the front post reclines to place the seat on the deck plates, the locking hook will automatically lock the front post, holding the seat in place for standing drive, and by pressing the lever rearward, the locking hook will disengage with the front post, enabling the parallel posts to be raised to place the seat in the sitting drive position.

7. The electric scooter of standing-sitting drive as cited in claim 4 wherein said tilting joint locking device further comprises a circular collar, a tooth sector, a locking bar, a tilting lever, a spring, and a fold disk hinging at the folding hinge of the folding joint, and said circular collar hinges on the tilting hinge of the tilting joint, and secures the lower end of said lower handlebar stem, and has a longitudinal square hole at its front side in line with the tilting hinge, and said tooth sector mounts on said fold disk and has a front circular edge centering on the tilting hinge, and the periphery of the circular edge has locking teeth, and said locking bar positions in said square hole, and its rear end has locking teeth engaging with the circular sector, and said tilting lever hinges its right end on a vertical pin secured at the front end of the locking bar, and its middle part engages with the spring and hinges on a protruded bracket of the circular collar and its left end is a lever, and the tilting lever presses on the locking bar by the spring force to engage with the circular sector, and by pulling the tilting lever rearward, the locking bar will disengage, allowing the lower handlebar stem to tilt rearward and lock at selected angles.

8. The electric scooter of standing-sitting drive as cited in claim 4 wherein said holding clamp further comprises an upper half-round clamp, a lower half-round clamp secured to the beck beam of the head tube, and a locking hook, and both half-round clamps hinge together on one side to hold said lower handlebar stem inside, and are locked together on the other side by said locking hook, and by releasing the locking hook, the upper half-round clamp will open up by a spring to stay in an open position.

9. The electric scooter of standing-sitting drive as cited in claim 4 wherein said seat further comprises a removable seat cushion.

\* \* \* \* \*